United States Patent [19]

Menke et al.

[11] Patent Number: 5,368,147
[45] Date of Patent: Nov. 29, 1994

[54] TESTING DEVICE FOR BANK NOTES

[75] Inventors: Wilhelm Menke, Wiesbaden; Arjen J. Mulder, Bingen, both of Germany

[73] Assignee: NSM Aktiengesellschaft, Bingen, Germany

[21] Appl. No.: 910,152
[22] PCT Filed: Jan. 19, 1991
[86] PCT No.: PCT/DE91/00055
§ 371 Date: Jul. 22, 1992
§ 102(e) Date: Jul. 22, 1992
[87] PCT Pub. No.: WO91/10975
PCT Pub. Date: Jul. 25, 1991

[30] Foreign Application Priority Data

Jan. 22, 1990 [DE] Germany .................. 4001716

[51] Int. Cl.⁵ .................................. G07D 7/00
[52] U.S. Cl. .......................... 194/206; 271/240
[58] Field of Search ........... 194/206, 207; 271/240; 235/484

[56] References Cited

U.S. PATENT DOCUMENTS

| | | | |
|---|---|---|---|
| 4,098,458 | 7/1978 | Auchinleck | 235/484 |
| 4,301,361 | 11/1981 | Lees | 235/484 |
| 4,657,239 | 4/1987 | Iesue et al. | 271/240 |
| 5,091,754 | 2/1992 | Abe et al. | 271/240 |
| 5,215,303 | 6/1993 | Yamada et al. | 271/240 |

FOREIGN PATENT DOCUMENTS

0312009 4/1989 European Pat. Off. .
2747795 5/1978 Germany .

Primary Examiner—F. J. Bartuska
Attorney, Agent, or Firm—Spencer, Frank & Schneider

[57] ABSTRACT

A testing device for bank notes, or similar instruments of payment in sheet form for automatic vending machines, has a testing channel (20) with a transport device (7) and scanning devices for recognizing and checking the authenticity of the bank note (3). An input channel (2) of variable width is in front of the testing channel (20). The input channel (2) includes two channel halves (21), one on either side of the longitudinal center axis (22) of the input channel (2). The two channel halves (21) can be adjusted synchronously against the force of a spring. In their contact position, the channel halves (21) determine the minimum width of the channel, and in their separated end position they determine the maximum width. A bank note (3) of any type is introduced into the input channel (2) at its locked maximum channel width as far as a passage detector (19) arranged in a starting region of the testing channel (20). The passage detector (19) unlocks the channel halves (21), as a result of which the side walls (23) of the channel halves (21) are pressed by the force of a spring against the bank note (3) and align it centrally with the testing channel (20).

14 Claims, 5 Drawing Sheets

TESTING DEVICE FOR BANK NOTES

BACKGROUND OF THE INVENTION

The invention relates to a testing device for bank notes or similar legal tender in sheet form for automatic vending machines, the testing device being of the type which includes a transporting device and a testing channel equipped with scanning devices for recognizing and checking the authenticity of the bank note, the testing channel being preceded by an input channel having an adjustable width.

DE 2,747,795.A1 already discloses a document reader in which the positioning of the document during passage through the transporting channel relative to the transporting elements is set as a function of the width of the document. In other words, the transporting means characterized by rollers are stationary but the positioning of the document during transport is determined by adjustment means which set the position relative to the transporting means as a function of the width of the document. The transporting channel of the document reader through which the documents are guided during the scanning process is equipped with an adjustable side wall for a determination of either certain widths of the transporting channel or a width range for operation with documents of any desired width within this range. The scanning unit of the document reader may be preceded by an input unit, with adjustment elements for the channel width being provided in the input unit and in the scanning unit. The adjustment elements for the width of the transporting channel in the scanning unit here respond in their width setting as a function of the position of the width setting elements of the input unit. Thus separate width adjustment elements are required for the channel of the input unit and for the channel of the scanning unit which is extremely expensive from a manufacturing point of view. Since the width setting of the channels is effected in each case by changing the position of a movable side wall relative to a fixed side wall, the position of the longitudinal center axis of the channels changes correspondingly. Such a displacement of the longitudinal center axis of the channel of the scanning unit as a function of the width of the document to be checked is a drawback insofar as, for the checking of bank notes which generally have the same identifying marks at the same distance from their longitudinal center axis regardless of their width, a number of scanning devices corresponding to the number of different widths must be used for the same identifying feature on several bank notes of different widths.

SUMMARY OF THE INVENTION

It is the object of the invention to provide a testing device of the above mentioned type which overall has a simple and compact structure and permits accurate input of bank notes of different widths in a centrally aligned longitudinal direction toward and into a testing channel.

This is accomplished by the invention in that
the input channel is composed of two channel halves that are separated along the longitudinal center axis of the input channel and are adjustable in parallel and in synchronism against the force of a spring;
in their contacting position, the channel halves define the minimum channel width and in their separated end position they define the maximum channel width;
the introduction of each bank note into the input channel, when the maximum channel width is locked in, is effected up to a passage detector disposed in the starting region of the testing channel; and
the passage detector causes the locking of the channel halves to be released so that the side walls of the channel halves place themselves against the bank note under the force of the spring and align the note so that it is centered in the middle of the testing channel.

The significant advantage realized by the invention is the precisely flush alignment of the longitudinal center axes of bank notes of different widths that are introduced longitudinally into the input channel with the longitudinal center axis of the testing channel. Consequently, a width adjustment of the testing channel is unnecessary which, on the one hand, results in a relatively simple configuration and, on the other hand, permits the simultaneous use of certain measuring locations of the scanning device for bank notes of different widths. Due to the synchronous parallel adjustment of the channel halves of the input channel between the minimum channel width and the maximum channel width, each bank note of any desired width falling within the above-mentioned channel width range can have its longitudinal center aligned to coincide with the center of the testing channel.

In order to realize an automatic adjustment of the testing device for the checking of bank notes of a given width, an advantageous feature of the invention couples the synchronous adjustment of the channel halves with a measuring device for detecting the width of the bank notes by means of which an appropriate bank note checking program dependent on the width of the bank notes can be activated in the scanning devices.

In order to realize a structurally simple operation of the channel halves of the input channel, the channel halves, according to an advantageous modification of the invention, are in operative connection with a lever bar assembly which, by way of a control disc coupled with a drive motor by means of a worm gear, can be charged to effect the proper adjustment of the channel halves.

In a further advantageous embodiment of the invention, the channel halves, which have a U-shaped cross section, are guided so as to be slidably movable, by way of bearings shaped onto their upper faces, on three equidistant transverse shafts that are held in oppositely disposed supporting walls. This results in an accurately parallel guidance of the channel halves.

Advisably the center transverse shaft is provided in its center with a bearing pin for accommodating a three-armed angle lever of the lever bar assembly whose flush lever arms are articulated to the oppositely disposed longitudinal sides of the channel halves and whose rectangularly angled lever arm accommodates a pin at its end. Due to the action of a tension spring connected with this lever arm and the rear transverse axis, this pin lies in force locking contact at the free ends of an adjustment rod of the lever bar assembly. Thus a synchronous parallel displacement of the channel halves relative to one another is provided by simple means. Advisably, the free end region of the adjustment rod is here held in a pin guide that engages in a long hole or slot and is articulated at its other end to a two-sided lever which is pivotal about a bearing pin disposed in the longitudinal center axis of the testing channel. The free end of this lever, which is configured as a cam, lies against the control disc. Moreover, the control disc and the worm wheel of the worm gear are here preferably connected with one another so that they rotate together and are rotatably mounted on a common shaft.

In an advantageous embodiment of the solution according to the invention the transporting device for the bank notes includes a drive motor whose direction of rotation can be reversed for driving two endless toothed belts that are parallel to one another at a defined distance and which rest on pairs of rollers that are arranged within the width of the path of the bank notes in the region of the testing channel. The rollers are each opposed, in the direction of movement of the bank notes, by a spring tensioned pressure roller or runner, with the front pressure rollers or runners that directly face the input channel being removable from the toothed belts under positive control against the force of the spring. This makes it possible to insert a bank note, if the front pressure rollers or runners are lifted away, and push it manually into the intake region of the testing channel and then, after the front contact rollers or runners have been lowered, let the forced transport of the bank note through the testing channel by means of the transporting device begin.

In order to obtain a structurally simple embodiment of the adjustment of the front pressure rollers, an advantageous feature of the invention provides that the axes of the front pressure rollers and pins shaped laterally to the runners, in order to properly control their height adjustment, are in operative connection, by way of a spring-tensioned lever arrangement, with a cam disc which is fastened to and rotates with the control disc that charges the channel halves, the cam disc being rotatably mounted on the shaft of the worm wheel of the worm gear drive. Advisably the lever arrangement includes two flat levers that are longitudinally displaceable on the oppositely disposed side walls of the testing device and are each provided with a cam track that is associated with the shaft of the corresponding front pressure roller and with one of the pins of the front runners, respectively. At their ends opposite the cam track, the flat levers are each provided with an indentation into which engage the diametral arms of a three-armed pivot lever that is charged by the cam disc. Additionally it is preferably provided that the three-armed pivot lever is mounted on the bearing pin disposed in the longitudinal center axis of the testing channel and its cam arm, which is angled away from the diametral arms, rests against the cam disc due to the action of a tension spring that acts on the respective arm.

In order to monitor the adjustment of the channel halves of the input channel and the front pressure rollers or runners in a further advantageous embodiment of the solution according to the invention, a spring tensioned two-armed lever is supported on the bearing pin accommodating the three-armed pivot lever of the lever arrangement and the two-sided lever of the lever bar assembly. This two-armed lever cooperates, on the one hand, with a cam disc that is coupled with the drive motor and, on the other hand, with the forks of two fork couplers that generate positioning pulses. Advisably the end of the two-armed lever facing the cam disc is here configured as a cam which, due to the action of a tension spring extending between an angled portion of the two-armed lever and a pin disposed at the upper wall of the testing device, lies against the cam disc. The cam disc is fastened to the worm wheel of the worm gear so as to rotate together with it and is also rotatably supported on the shaft of the worm wheel.

In order to easily determine the opening width of the channel halves of the input channel when a bank note of a certain width is inserted, the measuring device for determining the width of the bank notes includes, as an advantageous feature of the invention, a disc equipped with a ring of perforations. The ring of perforations, which is arranged at an angle to the disc, moves in the forks of two fork couplers that are arranged with an offset of 90° to one another and generate positioning pulses. The disc with the ring of perforations supports a toothed wheel that meshes with a toothed ring segment that is connected with the angle lever for making adjustments to the channel halves.

BRIEF DESCRIPTION OF THE DRAWINGS

The concept on which the invention is based will be described in greater detail in the description below with reference to an embodiment that is illustrated in the drawing figures, in which.

DESCRIPTION OF THE PREFERRED EMBODIMENT

Figure 1:
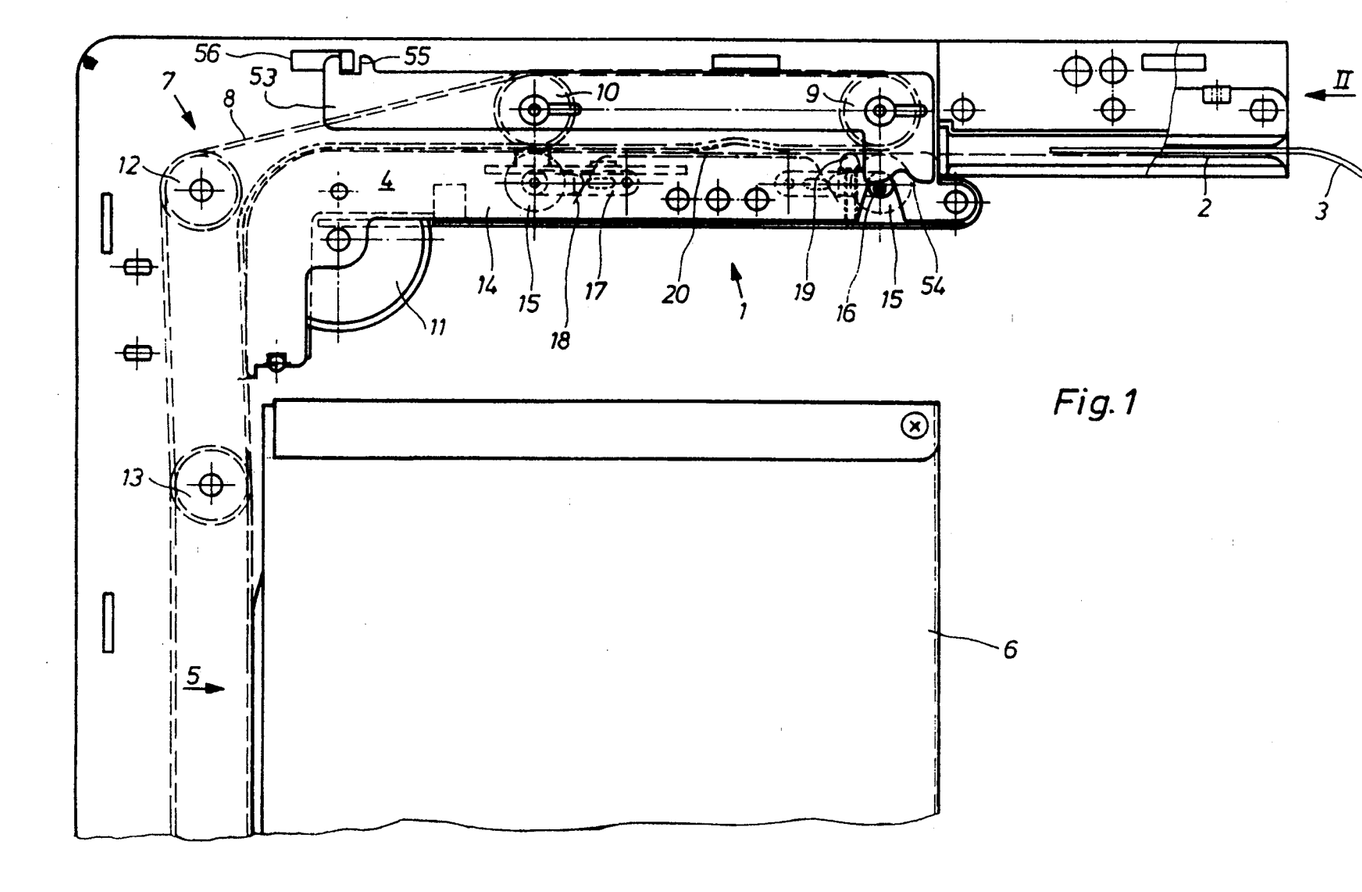
FIG. 1 is a side view of a bank note testing device including an input channel upstream and a stacking device downstream for storing the bank notes.
Figure 2:
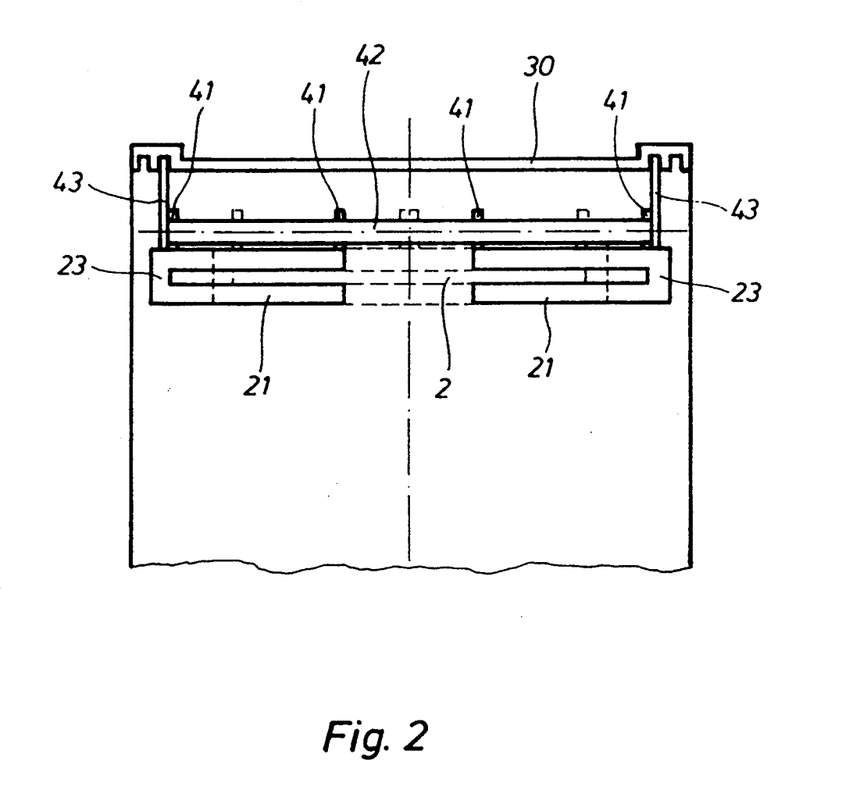
FIG. 2 is a front view of the arrangement of FIG. 1 viewed in the direction of arrow II.

The bank note testing device 1, which is arranged in a horizontal position, is preceded by an input channel 2 for a bank note 3. The outlet of testing device 1 is directly followed by a 90° transfer guide 4 for a bank note 3 leaving testing device 1 for guiding bank note 3 to a stacking device 5 that is attached in a vertical position. Stacking device 5 is disposed opposite the charging opening of a bank note stack container 6 which in its interior is provided with a spring-tensioned plate. The transport of bank note 3 in its longitudinal format through testing device 1 over the 90° transfer guide 4 into the stackable position between stacking device 5 and the charging opening of stack container 6 takes place by way of a transporting device 7 that includes two endless toothed belts 8 extending parallel to one another at a certain distance. Toothed belts 8 are placed onto pairs of reversal rollers 9 in the intake region of testing device 1, intermediate roller 10 in the discharge region of testing device 1, deflection rollers 11 and 12 of transfer guide 4, supporting rollers 13 in the upper region of stacking device 5 and non-illustrated drive rollers which are coupled by way of a worm gear with a reversible rotation drive motor, with all rollers being mounted on shafts that are held in side walls 14. Moreover, four spring-tensioned pressure rollers 15 are fastened to side walls 14; they lie against the toothed belts 8 in the region of the pairs of reversal rollers 9 and intermediate rollers 10. The bank note 3 is thus gripped and carried by pressure rollers 15 in cooperation with toothed belts 8. The shaft 16 of each pressure roller 15 is held in a pivotally movable holder 17 that is fastened in the associated side wall 14, with the respective series arranged holders 17 being charged by a common wire spring 18 in the direction toward toothed belts 8.

In order to determine the presence of a bank note 3 in testing device 1, a passage detector 19 that is coupled with a switching device is disposed behind the front pressure roller 15 in the path of movement of bank note 3. Moreover, testing device 1 is equipped with scanning devices associated in a known manner with testing channel 20, which are not illustrated in detail, for checking the authenticity of a bank note 3.

Figure 3:
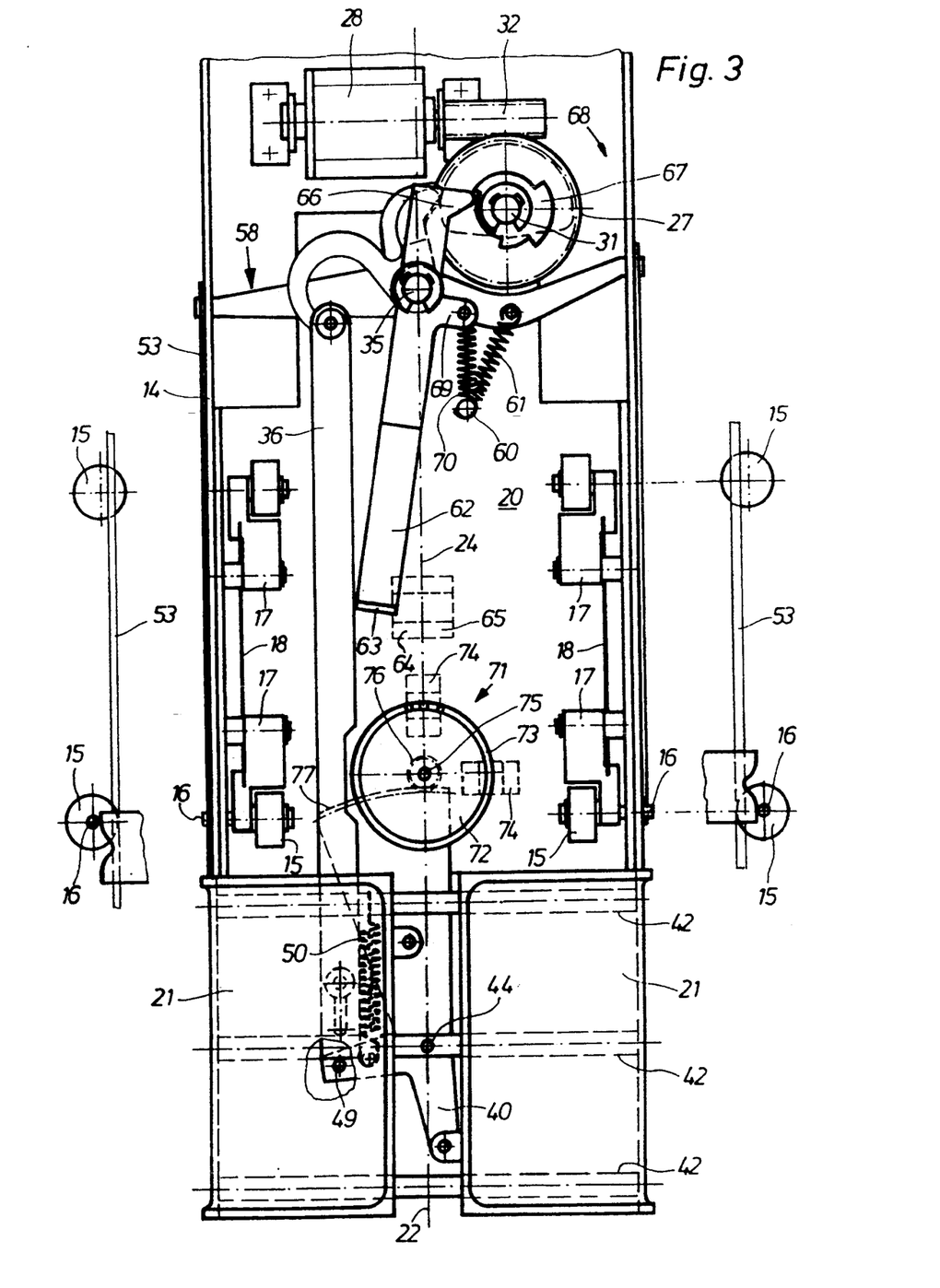
FIG. 3 is a bottom view in a simplified representation of the testing device of FIG. 1 and its associated input channel.

Input channel 2 is composed of two channel halves 21 that have a U-shaped cross section and can be moved back and forth in parallel and in synchronism relative to the longitudinal center axis 22 of input channel 2. In the contact position of channel halves 21, produced by spring force, these channel halves define the minimum channel width of the input channel while the separated, lockable end position with the channel halves 21 being moved apart against the spring force defines the maximum channel width of input channel 2. If input channel 2 is locked in the maximum channel width, a bank note 3 is pushed manually through input channel 2 up to passage detector 19, which then sends a signal to the switching device that in turn initiates the release of the lock of channel halves 21 so that, due to the spring force, the interior faces of side walls 23 of channel halves 21 place themselves against the longitudinal sides of the bank note and thus align its longitudinal center axis precisely with the longitudinal center axis 24 of testing channel 20.

In order to control the sequence of movements of channel halves 21, a spring tensioned lever bar assembly 25 is provided that is connected with the channel halves and can be actuated by means of a control disc or cam 26 that is connected to rotate together with the worm wheel 27 of a worm gear 29 coupled with a drive motor 28. Control cam 26 and worm wheel 27 are mounted so as to rotate on a common shaft 31 that is held at the upper wall 30 of testing device 1. The drive motor 28, whose shaft carries a worm 32 that meshes with worm wheel 27, is also fastened to upper wall 30. In the form of a cam follower 33, the free end of a two-sided lever 34 lies against control cam 26. This lever 34 is rotatably held on a bearing pin 35 that lies in the longitudinal center axis 24 of testing channel 20 and is fastened to upper wall 30. An adjustment rod 36 articulated to lever 34 extends up to channel halves 21 and is held above channel halves 21 by a pin guide 38 that engages in a long hole or slot 37 and whose pin 39 is fastened to upper wall 30. The free end of adjustment rod 36 cooperates with a three-armed angle lever 40 which is coupled with channel halves 21. On their upper faces, channel halves 21 are provided with shaped-on bearings 41 by means of which channel halves 21 are guided so as to slidably move on three equidistant transverse shafts 42. Supporting walls 43 fastened opposite one another to upper wall 30 accommodate transverse shafts 42. The middle transverse shaft 42 is provided with a pin 44 in its center, on which angle lever 40 is pivotally mounted. The mutually flush lever arms 45 of angle lever 40 are connected by way of pins 46 with diametrally oppositely disposed bearing brackets 47 that are shaped onto the mutually facing longitudinal sides of channel halves 21. A lever arm 48 whose end carries a pin 49 branches off at a right angle from the mutually flush lever arms 45 of angle lever 40. Due to the action of a tension spring 50 connected with lever arm 48 and the rear transverse shaft 42, this pin 49 lies against the free end of adjustment rod 36. Control cam 26 is thus designed in such a way that, if a bank note 3 is introduced into the input channel, channel halves 21 take on the locked maximum channel width setting shown in FIGS. 3 to 5. The locking of channel halves 21 is then released by actuation of drive motor 28 by way of passage detector 19.

Figure 4:
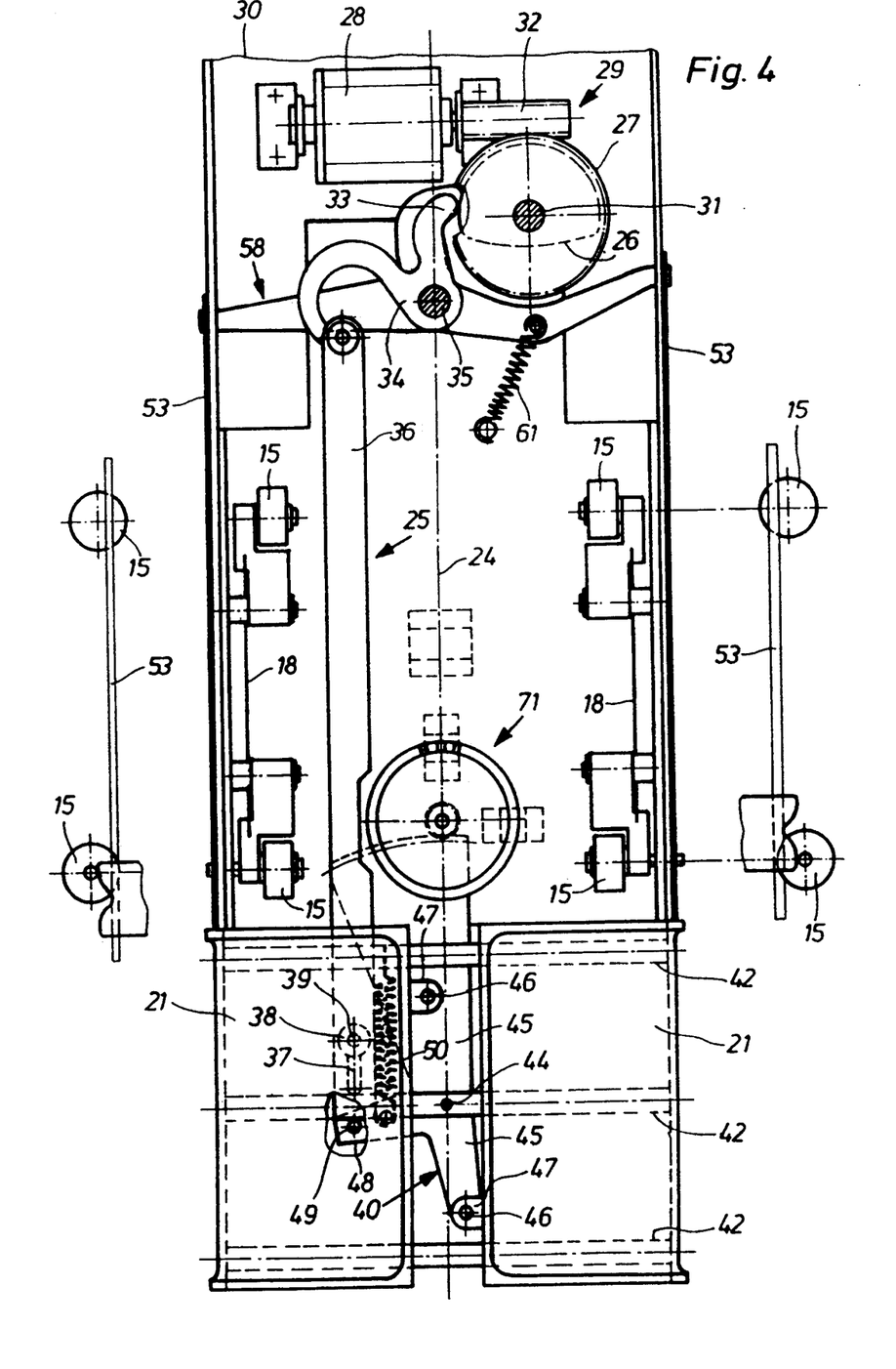
FIG. 4 is an illustration according to FIG. 3 but without the two-armed lever and without the cam disc associated with this lever.
Figure 5:
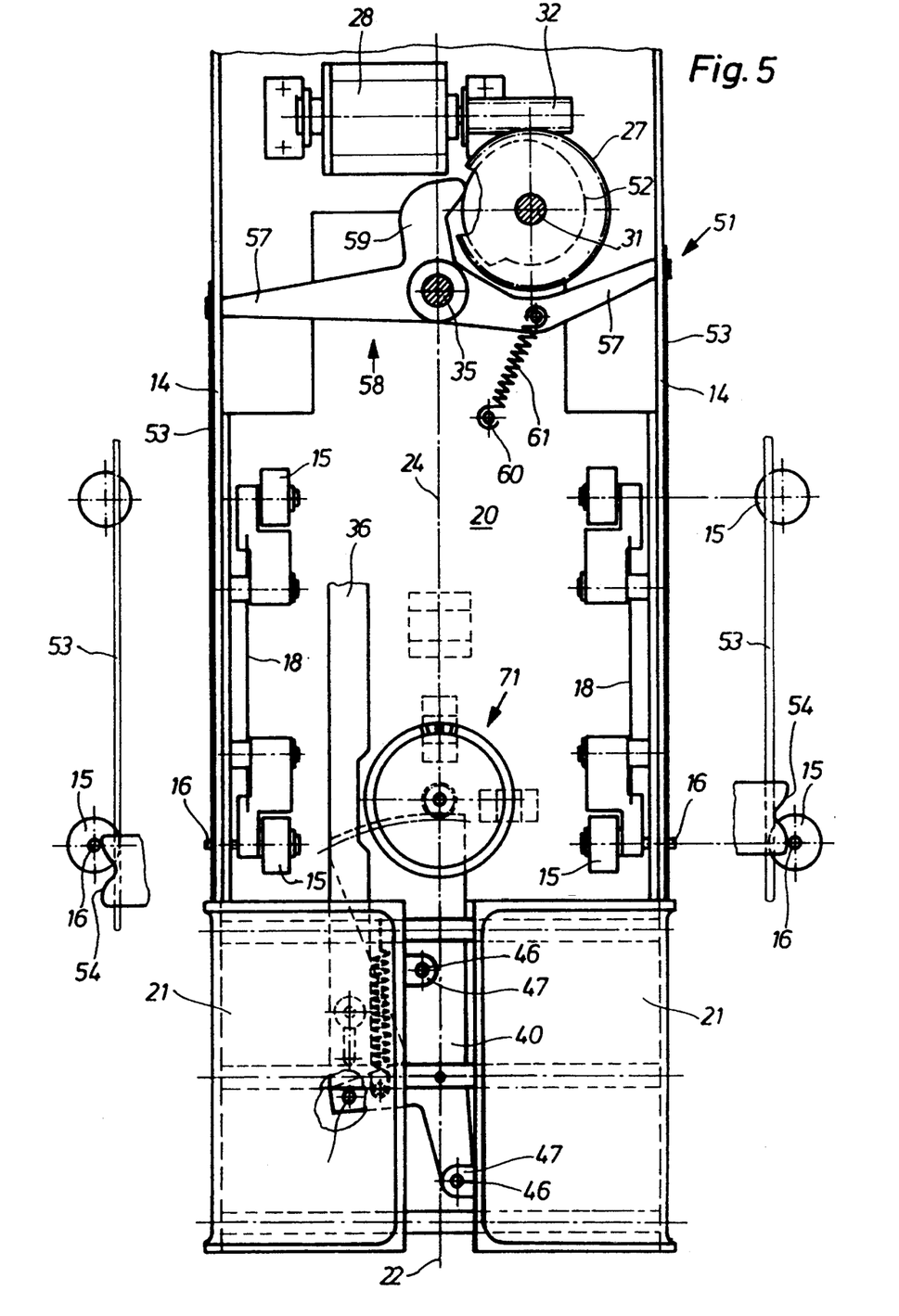
FIG. 5, is an illustration according to FIG. 3 but without the two-armed lever and the associated cam disc and without the two-sided lever and its associated control disc.

In order to securely grip bank note 3 in the intake region of testing channel 20, the front, spring tensioned pressure rollers 15 may be lifted from toothed belts 8 under a positive control and then lowered again. For this purpose, the shafts 16 of the front pressure rollers 15 are in operative connection by way of a spring tensioned lever arrangement 51 with a cam 52 which is fastened to rotate with control cam 26 and is mounted on common shaft 31. The shafts 16 of the front pressure rollers extend outwardly through corresponding notches in the side walls 14 and are here each supported at a cam track 54 that is formed in a flat lever 53. The flat levers 53, which are held to be longitudinally displaceable on the exterior faces of side walls 14, are provided with an indentation 55 on the side opposite cam track 54 into which engage the diametral arms 57 of the three-armed pivot lever 58 that extend through respective long holes or slots 56 in side walls 14. Pivot lever 58 is likewise mounted on bearing pin 35 and its cam follower arm 59, which is angled away from the diametral arms 57, lies under spring tension against cam 52. Between a pin 60 fastened to upper wall 30 and the corresponding arm 57 of pivot lever 58, there extends a tension spring 61. Cam 52 is designed in such a way that, with the input channel locked at its maximum width, the cams tracks 54 of flat levers 53 lift the front pressure rollers 15 away from toothed belts 8. Only if the centering of the bank note 3 in its longitudinal center has been completed by the unlocked channel halves 21, are the front pressure rollers 15 released by the cam 52, which is charged by drive motor 28, and by the associated lever arrangement 51 so that, because of the action of wire springs 18, they press bank note 3 against toothed belts 8 and thus ensure reliable transport of bank note 3.

In order to monitor the motion sequence of channel halves 21 and of front pressure rollers 15, a two-armed lever 62 is provided which is pivotally mounted on bearing pin 35 and cooperates, on the one hand, by way of a bend 63 with two juxtaposed fork couplers 64 and 65 and, on the other hand, by way of a cam follower 66, with a cam 67. Cam 67 is connected so as to rotate together with worm wheel 27, which rotates in the direction of arrow 68. An angled portion 69 branches off from lever 62 and is coupled by way of a tension spring 70 with pin 60. In the locked position of the channel halves 21 of input channel 2, the bend 63 of lever 62 is disposed outside of fork couplers 64 and 65. As soon as the alignment of bank note 3 to its longitudinal center has been completed by the unlocked channel halves 21, lever 62 drops into fork coupler 64, which forwards a corresponding information signal to the switching device. As soon as the front pressure rollers 15 have been lowered, lever 62 drops into fork coupler 65 so that the switching device receives a signal for startling transporting device 7. In order to permit the return of an unacceptable bank note, the channel halves again take up their locked position, with lever 62 again engaging in fork coupler 64 and there giving a corresponding signal to the switching device. Thereafter, the front pressure rollers are raised again, which is reported to the switching device by lever 62 exiting from fork coupler 64.

The detection of the width of the bank note is effected by way of a measuring device 71 which is coupled with the synchronous adjustment of channel halves 21 of input channel 2. Corresponding to the detected width of the inserted bank note, the measuring device initiates an associated testing program for the scanning devices, that is, the width of the bank note as determined by the measuring device determines the testing program that is applicable for this bank note. Measuring device 71 includes a disc 72 equipped with a ring of perforations 73 which is placed at an angle to the disc. Ring of perforations 73 moves in the forks of two fork couplers 74 that are offset by 90° relative to one another and generate positioning pulses while additionally permitting the detection of the direction of rotation of the disc 72 equipped with the ring of perforations. A toothed wheel 76 is connected with perforation disc 72, which is mounted to rotate concentrically with it on shaft 75; this toothed wheel 76 meshes with a toothed ring segment 77. This toothed ring segment 77 is a component of angle lever 40 for the adjustment of channel halves 21. The translatory movement of channel halves 21 is thus converted to a rotational movement of perforation disc 72 from which results the path traversed by channel halves 21.

The invention has been described and illustrated above with reference to a preferred embodiment thereof and selected features. Of course, the invention is not limited to this illustration. Instead all features may be employed alone or in any desired combination, also independently of their combination in the claims.

What we claim is:

1. An improved testing device for bank notes or similar legal tender in the form of sheets for automatic vending machines, the device including a transportation device (7) and a testing channel (20) which has a center axis (24) and which is equipped with scanning devices for the detection and authenticity checking of the bank note (3), with the testing channel being preceded by a variable width input channel (2) having a longitudinal center axis (22), wherein the improvement comprises:

the input channel (2) is composed of two channel halves (21) that are separated along the longitudinal center axis (22) of the input channel (2) and that are adjustable in synchronism and in parallel against the force of a spring;

the channel halves (21) have a contacting position which defines a minimum channel width and a separated end position which defines a maximum channel width;

the insertion of each bank note (3) into the input channel (2) occurs with the channel width locked in its maximum position up to a passage detector (19) disposed in a starting region of the testing channel (20); and the passage detector (19) initiates the release of the lock of the channel halves (21) so that the side walls (23) of the channel halves (21) place themselves, due to the force of the spring, against the bank note (3) and align its center with the center axis (24) of the testing channel (20).

2. A testing device according to claim 1, wherein a measuring device (71) for detecting the width of the bank notes is coupled with the synchronous adjustment of the channel halves (21), with an appropriate bank note checking program that is dependent on the width of the bank notes being activatable in the scanning devices by way of said measuring device.

3. A testing device according to claim 1, wherein the channel halves (21) of the input channel (2) are in operative connection with a spring-tensioned lever bar assembly (25) which can be charged by way of a control cam (26) that is coupled with a drive motor (28) by way of a worm gear arrangement (29) for the proper adjustment of the channel halves (21).

4. A testing device according to claim 1, wherein the channel halves (21) have a U-shaped cross section and are held so as to be slidably movable by way of bearings (41) provided on their upper face on three equidistant transverse shafts (42) which are held in oppositely disposed supporting walls (43).

5. A testing device according to claim 4, wherein the central transverse shaft (42) is provided in its center with a bearing pin (44) for accommodating a three-armed angle lever (40) of a spring-tensioned lever bar assembly (25) which can be changed by way of a control cam (26) that is coupled with a drive motor (28) by way of a worm gear arrangement (29) for the proper adjustment of the channel halves (21), the three-armed angle lever (40) having flush lever arms (45) which are articulated to the oppositely disposed longitudinal sides of the channel halves (21) and having a further lever arm (48) with an end that is bent away at a right angle and that receives a pin (49), which, due to the action of a tension spring (50) connected with the further lever arm (48) and with the rear transverse shaft (42), is in force locking contact with the free end of an adjustment rod (36) of the lever bar assembly (25).

6. A testing device according to claim 5, wherein a free end region of the adjustment rod (36) is held in a pin guide (38) that engages in a slot (37) and another end of the adjustment rod (36) is articulated to a two-sided lever (34) which is pivotal about a bearing pin (35) disposed at the center axis (24) of the testing channel (20), the two-sided lever (34) having an arm which serves as a cam follower (33) and which lies against the control cam (26).

7. A testing device according to claim 3, wherein the control cam (26) and a worm wheel (27) of the worm gear arrangement (29) are connected so as to rotate with one another and are rotatably mounted on a common shaft (31).

8. A testing device according to claim 1, wherein the transporting device (7) for the bank note (3) includes a reversible-rotation drive motor for two endless toothed belts (8) that extend parallel to one another at a defined distance and are placed onto pairs of rollers (9, 10) disposed within the path width of the bank note (3) in the region of the testing channel (20), with said rollers each being faced, in the path of movement of the bank note (3), by a spring tensioned pressure roller (15) or runner, with it being possible to lift the two front pressure rollers (15) or runners directly facing the input channel (2) away from the toothed belts (8) under a positive control and against the force of a spring.

9. A testing device according to claim 8, wherein the channel halves (21) of the input channel (2) are in operative connection with a spring-tensioned lever bar assembly (25) which can be charged by way of a control cam (26) that is coupled with a drive motor (28) by way of a worm gear arrangement (29) for the proper adjustment of the channel halves (21), wherein the worm gear arrangement (29) includes a worm wheel (27) and a shaft (31) on which the worm wheel (27) is mounted, wherein the front pressure rollers (15) are mounted on shafts (16), and wherein the shafts (16) of the front pressure rollers (15) and pins formed laterally onto the runners, respectively, are in operative connection, in order to properly control their height adjustment, by way of a spring tensioned lever arrangement (51) with a further cam (52) which is fastened so as to rotate with the control cam (26) that charges the channel halves (21) and which is rotatably mounted on the shaft (31) of the worm wheel (27) of the worm gear arrangement (29).

10. A testing device according to claim 9, wherein the testing device (1) includes a pair of oppositely disposed side walls (14), and wherein the lever arrangement (51) includes two flat levers (53) that are longitudinally displaceable on the oppositely disposed side walls (14) of the testing device (1) and are each provided with a cam track (54) that is associated with the shaft (16) of the respective front pressure roller (15) and with one of the pins of the front runners, respectively, and, at their ends opposite the cam track (54), with respective indentations (55) into which engage diametral arms (57) of a three-armed pivot lever (58) that is charged by the further cam (52).

11. A testing device according to claim 10, wherein the three-armed pivot lever (58) is mounted on a bearing pin (35) disposed at the center axis (24) of the testing channel (20), the three-armed pivot lever (58) additionally having a further arm which serves as a cam follower (59) and which is angled away from the diametral arms (57) of the three-armed pivot lever (58), the cam follower (59) lying against the further cam (52) due to the action of a tension spring (61) which engages the three-armed pivot lever (58).

12. A testing device according to claim 11, wherein a spring-tensioned two-armed lever (62) is mounted on the bearing pin (35) that accommodates the three-armed pivot lever (58) of the lever arrangement (51) as well as a two-sided lever (34) of a lever bar assembly (25), with said two-armed lever (64) cooperating, on the one hand, with another cam (67) that is coupled with the drive motor (28) and, on the other hand, with two fork couplers (64, 65) that generate positioning pulses.

13. A testing device according to claim 12, wherein an end of the two-armed lever (62) facing the another cam (67) is configured as a cam follower (66) which, due to the action of a tension spring (70) extending between an angled portion (69) of the two-armed lever (62) and a pin (60) disposed at an upper wall (30) of the testing device (1), lies against the another cam (67), with the another cam (67) being fastened so as to rotate together with the worm wheel (27) of worm gear arrangement (29) and likewise being rotatably mounted on the shaft (31) of the worm wheel (27).

14. A testing device according to claim 5, wherein a measuring device (71) for the detection of the width of the bank notes includes a perforated disc (72) having a ring of perforations (73) which is angled away from the disc and which moves in the forks of two mutually 90° offset fork couplers (74) that generate positioning pulses, with the perforated disc (72) carrying a toothed wheel (76) that meshes with a toothed ring segment (77) connected with the angle lever (40) in order to adjust the channel halves (21).

* * * * *